(12) United States Patent
Abe (10) Patent No.: US 10,203,347 B2
(45) Date of Patent: Feb. 12, 2019

(54) STATE FINDING APPARATUS FINDING STATE OF OBJECT BASED ON VALUE OF ANGULAR VELOCITY

(71) Applicant: CASIO COMPUTER CO., LTD., Shibuya-ku, Tokyo (JP)

(72) Inventor: Kazuaki Abe, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 803 days.

(21) Appl. No.: 13/968,186

(22) Filed: Aug. 15, 2013

(65) Prior Publication Data

US 2014/0083187 A1    Mar. 27, 2014

(30) Foreign Application Priority Data

Sep. 21, 2012  (JP) ................. 2012-207760

(51) Int. Cl.
*G01P 3/00* (2006.01)
*A63B 24/00* (2006.01)
*G01P 3/56* (2006.01)

(52) U.S. Cl.
CPC ............ *G01P 3/00* (2013.01); *A63B 24/0021* (2013.01); *G01P 3/56* (2013.01)

(58) Field of Classification Search
CPC ........... G01P 3/00; G01P 3/56; A63B 24/0021
See application file for complete search history.

(56) References Cited

U.S. PATENT DOCUMENTS

| 5,332,225 | A | * | 7/1994 | Ura | A63B 69/3685 |
| | | | | | 473/223 |
| 8,944,939 | B2 | * | 2/2015 | Clark | A63B 71/0619 |
| | | | | | 463/36 |
| 9,214,128 | B2 | * | 12/2015 | Yamada | G09G 5/00 |
| 9,661,894 | B2 | * | 5/2017 | Niegowski | A43B 3/0005 |
| 9,864,904 | B2 | * | 1/2018 | Saiki | G06K 9/00342 |
| 2004/0023724 | A1 | * | 2/2004 | Manwaring | A63B 57/00 |
| | | | | | 473/198 |
| 2004/0259651 | A1 | * | 12/2004 | Storek | A63B 69/3632 |
| | | | | | 473/131 |
| 2005/0153787 | A1 | * | 7/2005 | Kim | A63B 69/3652 |
| | | | | | 473/160 |

(Continued)

FOREIGN PATENT DOCUMENTS

CN         201955350 U    8/2011
CN         102553194 A    7/2012

(Continued)

OTHER PUBLICATIONS

Chinese Office Action (and English translation thereof) dated Jun. 19, 2015, issued in counterpart Chinese Application No. 201310384383.2.

(Continued)

*Primary Examiner* — Natalie Huls
(74) *Attorney, Agent, or Firm* — Holtz, Holtz & Volek PC (57) ABSTRACT

A state finding apparatus includes an obtaining unit and a finding unit. The obtaining unit obtains a value of an angular velocity of a first object around a predetermined axis when the first object and a second object contact with each other. The finding unit finds a state of the second object based on the obtained value of the angular velocity.

15 Claims, 7 Drawing Sheets

(56) References Cited

U.S. PATENT DOCUMENTS

| | | | | |
|---|---|---|---|---|
| 2005/0197198 A1* | 9/2005 | Otten | A63B 69/3614 | 473/221 |
| 2006/0140485 A1* | 6/2006 | Hing | A63B 24/0003 | 382/219 |
| 2007/0049393 A1* | 3/2007 | Gobush | A63B 69/3658 | 473/131 |
| 2008/0161140 A1* | 7/2008 | Misono | A63B 59/50 | 473/568 |
| 2008/0293488 A1* | 11/2008 | Cheng | A63F 13/10 | 463/31 |
| 2009/0011877 A1* | 1/2009 | Iwata | A63B 59/50 | 473/564 |
| 2010/0155155 A1* | 6/2010 | Matsukuma | B60K 26/02 | 180/19.3 |
| 2010/0245365 A1* | 9/2010 | Hato | A63F 13/10 | 345/473 |
| 2011/0086720 A1* | 4/2011 | Jaekel | A63B 24/0003 | 473/223 |
| 2011/0187660 A1* | 8/2011 | Hirata | G06F 3/03547 | 345/173 |
| 2011/0207560 A1* | 8/2011 | Wright | A63B 69/3632 | 473/407 |
| 2011/0224012 A1* | 9/2011 | Hashimoto | A63B 69/3632 | 473/223 |
| 2011/0230273 A1* | 9/2011 | Niegowski | A43B 3/0005 | 473/199 |
| 2011/0230986 A1* | 9/2011 | Lafortune | A43B 3/0005 | 700/93 |
| 2012/0128203 A1* | 5/2012 | Nakaoka | A63B 69/36 | 382/103 |
| 2012/0157241 A1* | 6/2012 | Nomura | A63B 69/0002 | 473/422 |
| 2012/0179418 A1* | 7/2012 | Takasugi | A63B 69/36 | 702/151 |
| 2013/0038634 A1* | 2/2013 | Yamada | G09G 5/00 | 345/649 |
| 2013/0127866 A1* | 5/2013 | Yamamoto | G06T 11/206 | 345/440 |
| 2013/0267336 A1* | 10/2013 | Boyd | A63B 69/3617 | 473/223 |
| 2014/0032138 A1* | 1/2014 | Shrestha | G01R 31/40 | 702/58 |
| 2014/0347265 A1* | 11/2014 | Aimone | G09G 3/003 | 345/156 |
| 2015/0018130 A1* | 1/2015 | Johnson | G06K 9/00342 | 473/409 |
| 2015/0057112 A1* | 2/2015 | Sak | A63B 24/0003 | 473/461 |
| 2015/0142375 A1* | 5/2015 | Ishikawa | G09B 19/0038 | 702/150 |
| 2015/0343293 A1* | 12/2015 | Koo | A63B 24/0006 | 702/141 |
| 2015/0369864 A1* | 12/2015 | Marlow | A61B 5/1128 | 702/191 |
| 2017/0157480 A1* | 6/2017 | Matsunaga | A63B 60/46 | |
| 2018/0021653 A1* | 1/2018 | Thornbrue | A63B 69/3685 | |
| 2018/0078820 A1* | 3/2018 | Bundock | A63B 24/0062 | |

FOREIGN PATENT DOCUMENTS

| | | |
|---|---|---|
| GB | 1334207 A | 10/1973 |
| JP | 02177976 A | 7/1990 |
| JP | H04141186 A | 5/1992 |
| JP | 2011-147500 A | 8/2011 |
| JP | 2013192756 A | 9/2013 |

OTHER PUBLICATIONS

Japanese Office Action (and English translation thereof) dated Oct. 4, 2016, issued in counterpart Japanese Application No. 2012-207760.

Japanese Office Action (and English translation thereof) dated Dec. 20, 2016, issued in counterpart Japanese Application No. 2012-207760.

Japanese Office Action (and English translation thereof) dated Apr. 11, 2017 issued in counterpart Japanese Application No. 2012-207760.

* cited by examiner

STATE FINDING APPARATUS FINDING STATE OF OBJECT BASED ON VALUE OF ANGULAR VELOCITY

CROSS REFERENCE TO RELATED APPLICATION

This application is based upon and claims the benefit of priority under 35 USC 119 of Japanese Patent Application No. 2012-207760 filed on Sep. 21, 2012, the entire disclosure of which, including the description, claims, drawings, and abstract, is incorporated herein by reference in its entirety.

BACKGROUND OF THE INVENTION

1. Field of the Invention

The present invention relates to a state finding apparatus, a state finding method and a storage medium each of which finds a state of an object on the basis of a value of an angular velocity.

2. Background Art

Conventionally, as a method for measuring the speed of an object which moves, such as a ball, the Doppler method is used. The Doppler method is a method by which the speed is calculated from a change between the frequency of radio waves transmitted to an object and the frequency of radio waves reflected by the object, which is disclosed, for example, in Japanese Patent Application Laid-Open Publication No. 2011-147500.

SUMMARY OF THE INVENTION

According to a first aspect of the present invention, there is provided a state finding apparatus including: an obtaining unit which obtains a value of an angular velocity of a first object around a predetermined axis when the first object and a second object contact with each other; and a finding unit which finds a state of the second object based on the obtained value of the angular velocity.

According to a second aspect of the present invention, there is provided a state finding method using a state finding apparatus, the state finding method including: an obtaining step of obtaining a value of an angular velocity of a first object around a predetermined axis when the first object and a second object contact with each other; and a finding step of finding a state of the second object based on the obtained value of the angular velocity.

According to a third aspect of the present invention, there is provided a computer readable storage medium where a program is stored, the program making a computer function as: an obtaining unit which obtains a value of an angular velocity of a first object around a predetermined axis when the first object and a second object contact with each other; and a finding unit which finds a state of the second object based on the obtained value of the angular velocity.

BRIEF DESCRIPTION OF THE DRAWINGS

The present invention will become more fully understood from the detailed description given hereinafter and the appended drawings, which are given byway of illustration only and thus are not intended as a definition of the limits of the present invention, wherein.

DETAILED DESCRIPTION OF THE PREFERRED EMBODIMENT

In the following, an embodiment of the present invention is described with reference to the drawings. However, the present invention is not limited to the illustrated embodiment.

Figure 1:
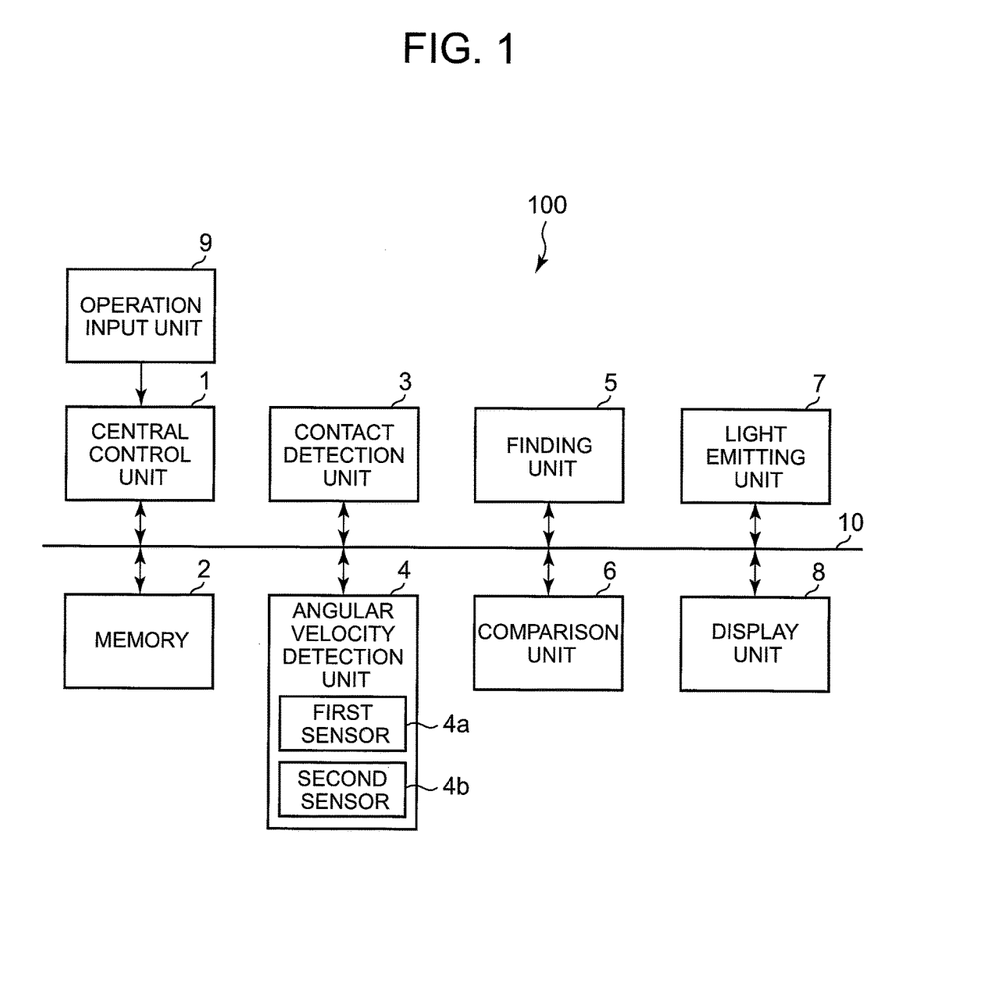
FIG. 1 is a block diagram schematically showing the configuration of a state finding apparatus in accordance with an embodiment of the present invention.
Figure 2:
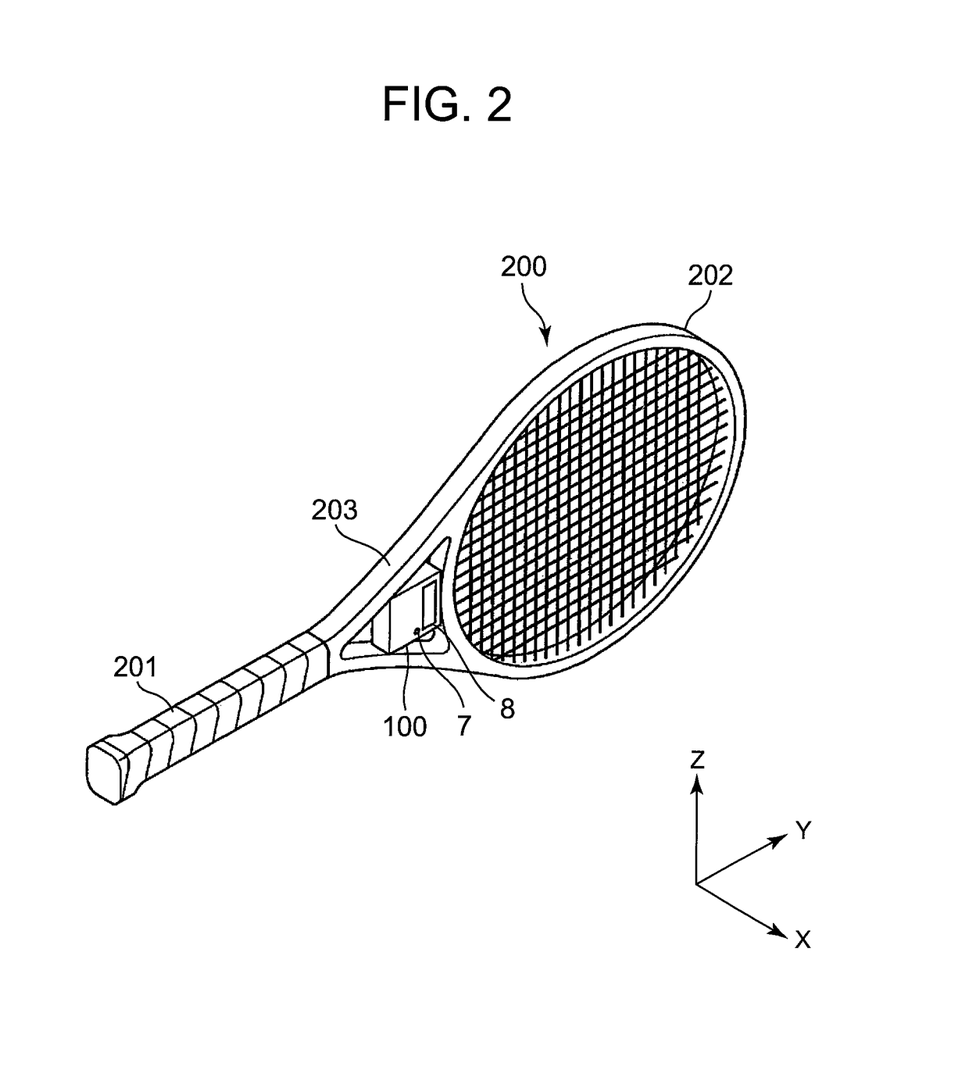
FIG. 2 schematically shows a state in which the state finding apparatus shown in FIG. 1 is attached to a tennis racket.

FIG. 1 is a block diagram schematically showing the configuration of a state finding apparatus 100 of an embodiment to which the present invention is applied. FIG. 2 schematically shows a state in which the state finding apparatus 100 is attached to a tennis racket 200.

In the following, a direction which is approximately perpendicular to the face of the tennis racket 200 is referred to as an X axis direction, a direction which is approximately perpendicular to the X axis direction and is the extending direction of a grip part 201 is referred to as a Y axis direction, and a direction which is approximately perpendicular to the X axis direction and to the Y axis direction is referred to as a Z axis direction.

As shown in FIG. 1, the state finding apparatus 100 of the embodiment includes a central control unit 1, a memory 2, a contact detection unit 3, an angular velocity detection unit 4, a state finding unit 5, a state comparison unit 6, a light emitting unit 7, a display unit 8 and an operation input unit 9.

The central control unit 1, the memory 2, the contact detection unit 3, the angular velocity detection unit 4, the state finding unit 5, the state comparison unit 6, the light emitting unit 7 and the display unit 8 are connected to each other via a bus line 10.

As shown in FIG. 2, for example, the state finding apparatus 100 is detachably attached to the tennis racket (tool) 200 with which a tennis ball B (object, shown in FIG. 4A etc.) is hit. More specifically, the state finding apparatus 100 is fixed to the inside of a shaft part 203 which is disposed between the grip (holding) part 201 held by a user of the tennis racket 200 and a head part 202 constituting the face of the tennis racket 200.

The center of the state finding apparatus 100 is fixed onto the Y axis in the extending direction of the grip part 201 inside the shaft part 203, for example. The state finding apparatus 100 may be directly fixed to the shaft part 203 or fixed thereto with a predetermined jig (not shown).

The central control unit 1 controls the units and the like of the state finding apparatus 100. More specifically, the central control unit 1 includes a CPU (Central Processing Unit), a RAM (Random Access Memory) and a ROM (Read Only Memory) (all not shown). The central control unit 1 performs various control operations in accordance with various process programs (not shown) for the state finding apparatus 100 stored in the ROM. The CPU stores results of the various processes in a storage region in the RAM and displays the results on the display unit 8 as needed.

The RAM includes: a program storage region where, for example, the process programs to be executed by the CPU are opened; and a data storage region where, for example, input data and the results generated by the execution of the process programs are stored.

The ROM stores therein, for example, programs in a form of program codes readable by a computer, such as a system program executable by the state finding apparatus 100 and the process programs executable by the system program, and data (for example, numerical values of various parameters to find the speed and the amount of rotation of the tennis ball B from values of angular velocities detected by the angular velocity detection unit 4) used to execute the process programs.

The memory 2 is constituted of a DRAM (Dynamic Random Access Memory) or the like and temporarily stores therein, for example, data processed by the central control unit 1, the contact detection unit 3, the angular velocity detection unit 4, the state finding unit 5, the state comparison unit 6, the display unit 8 and the like.

The contact detection unit 3 detects contact of the tennis ball B onto the tennis racket 200.

That is, the contact detection unit 3 detects contact between the tennis racket (tool) 200 and the tennis ball B. More specifically, the contact detection unit 3 detects contact between the tennis racket 200 and the tennis ball B on the basis of a Z axis angular velocity Gz of the state finding apparatus 100 around the Z axis which is approximately perpendicular to the extending direction of the grip part 201 of the tennis racket 200.

Figure 3:
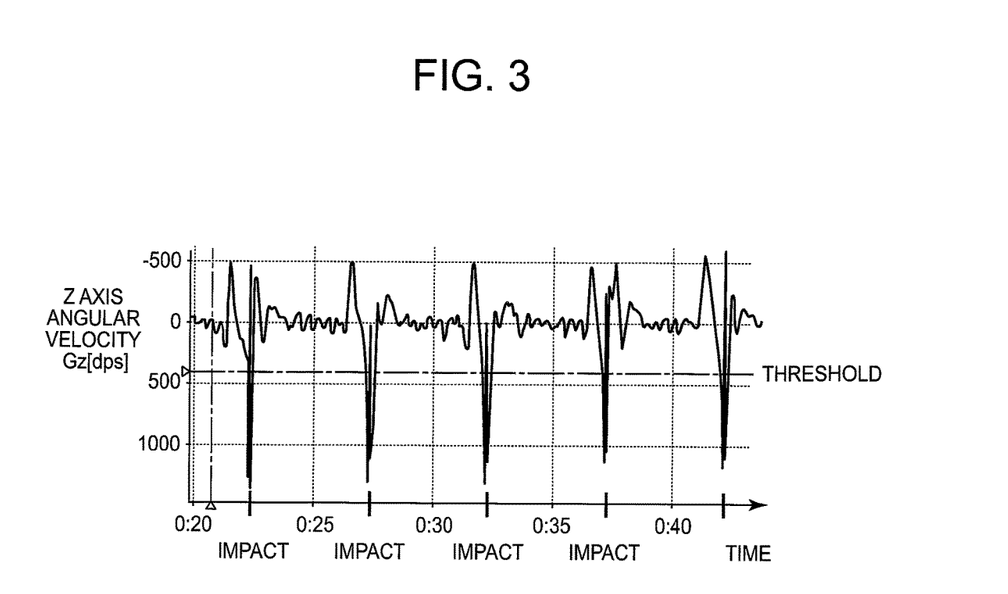
FIG. 3 schematically shows outputs of an angular velocity detection unit of the state finding apparatus shown in FIG. 1.

When a user hits the tennis ball B with the tennis racket 200 to which the state finding apparatus 100 is fixed, the value of the z axis angular velocity Gz just before the tennis ball B contacts the face of the tennis racket 200 is below a predetermined threshold, and the value of the z axis angular velocity Gz just after the tennis ball B contacts the face of the tennis racket 200 exceeds the predetermined threshold (see FIG. 3). Hence, the contact detection unit 3 detects timing at which the tennis racket 200 and the tennis ball B contact with each other from the value of the Z axis angular velocity Gz, using the predetermined threshold as a reference. Then, the contact detection unit 3 outputs timing information which indicates the detected timing of the contact to the angular velocity detection unit 4.

The contact detection unit 3 detects the Z axis angular velocity Gz, for example, with a first sensor 4a of the angular velocity detection unit 4 or with a dedicated sensor provided for the contact detection unit 3 use only.

The angular velocity detection unit 4 detects an angular velocity of the state finding apparatus 100 which rotates around a predetermined axis, i.e. an angular velocity of the state finding apparatus 100 around a predetermined axis.

The angular velocity detection unit 4 detects, on the basis of the detection of the contact between the tennis racket (tool or first object) 200 and the tennis ball B (second object) by the contact detection unit 3, an angular velocity of the state finding apparatus 100 around a predetermined axis of the time when the tennis racket 200 and the tennis ball B contact with each other. More specifically, the angular velocity detection unit 4 includes the first sensor 4a and a second sensor 4b and detects angular velocities (the Z axis angular velocity Gz and the X axis angular velocity Gx) of the state finding apparatus 100 around two axes (the Z axis and the X axis) which are perpendicular to each other with the first sensor 4a and the second sensor 4b, respectively.

The first sensor 4a detects the Z axis angular velocity Gz of the state finding apparatus 100 around the Z axis.

Figure 4A:
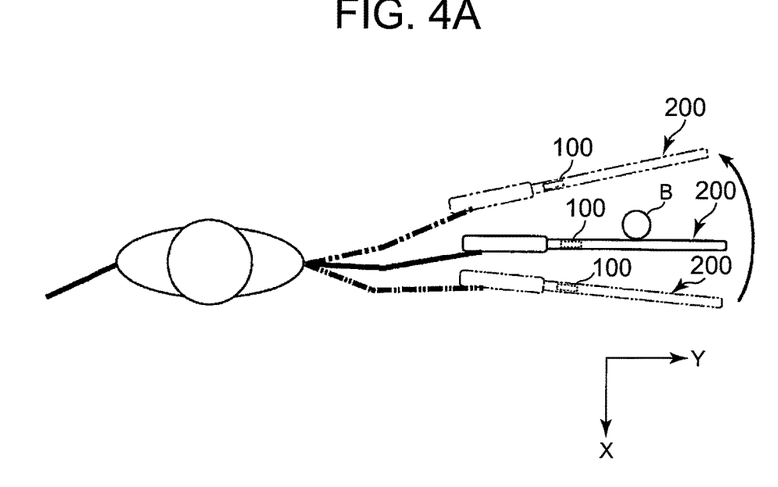
FIG. 4A schematically shows a state in which a tennis ball is hit with the tennis racket to which the state finding apparatus shown in FIG. 1 is attached.

That is, the first sensor 4a detects the Z axis angular velocity (first angular velocity) Gz of the state finding apparatus 100 around the Z axis (first axis), which is approximately parallel to a side of the face of the tennis racket 200, the side with which the tennis ball B is hit, and approximately perpendicular to the extending direction of the grip part 201 (see FIG. 4A).

More specifically, the first sensor 4a detects the Z axis angular velocity Gz of the state finding apparatus 100 around the Z axis when, for example, the information, which indicates the timing of the contact between the tennis racket 200 and the tennis ball B, is input into the first sensor 4a from the contact detection unit 3. Then, the first sensor 4a outputs the detected value of the Z axis angular velocity Gz to the state finding unit 5.

FIG. 4A schematically shows a state in which a right-handed user hits the tennis ball B with the tennis racket 200 with the forehand, from above the user in the Z axis direction.

The second sensor 4b detects the X axis angular velocity Gx of the state finding apparatus 100 around the X axis.

Figure 4B:
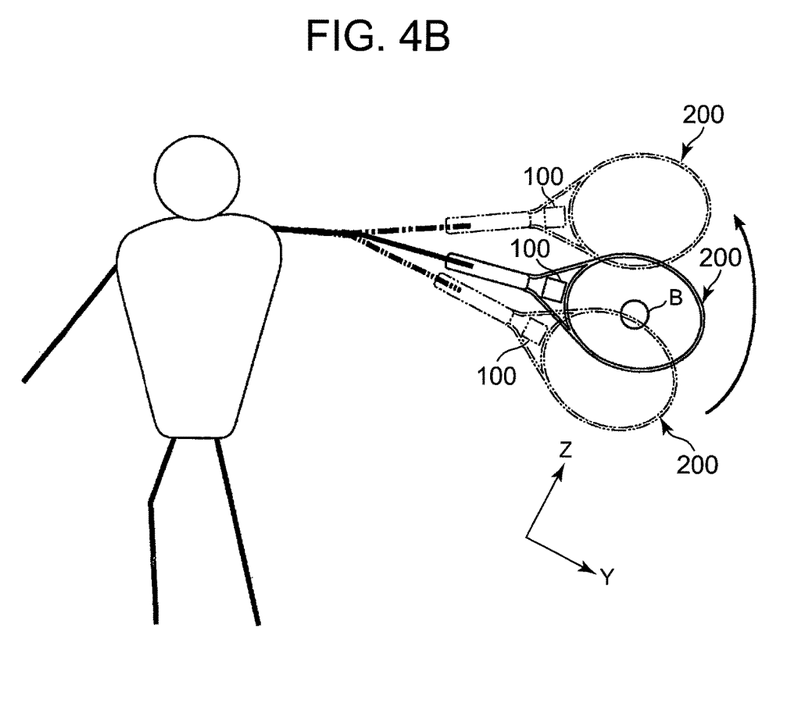
FIG. 4B schematically shows the state in which the tennis ball is hit with the tennis racket to which the state finding apparatus shown in FIG. 1 is attached.

That is, the second sensor 4b detects the X axis angular velocity (second angular velocity) Gx of the state finding apparatus 100 around the X axis (second axis), which is approximately perpendicular to the face of the tennis racket 200 and also approximately perpendicular to the extending direction of the grip part 201 and to the Z axis (see. FIG. 4B).

More specifically, the second sensor 4b detects the X axis angular velocity Gx of the state finding apparatus 100 around the X axis when, for example, the information, which indicates the timing of the contact between the tennis racket 200 and the tennis ball B, is input into the second sensor 4b from the contact detection unit 3. Then, the second sensor 4b outputs the detected value of the X axis angular velocity Gx to the state finding unit 5.

FIG. 4B schematically shows a state in which a right-handed user hits the tennis ball B with the tennis racket 200 with the forehand, from the back of the user in the X direction.

Thus, the angular velocity detection unit 4 obtains a value of an angular velocity of the tennis racket 200 (first object) around a predetermined axis of when the tennis racket 200 and the tennis ball B (second object) contact with each other.

The state finding unit 5 finds a state of the tennis ball B, which has been hit with the tennis racket 200.

That is, the state finding unit 5 finds a state of the tennis ball B having been hit with the tennis racket (tool) 200 on the basis of an angular velocity of the state finding apparatus 100 around a predetermined axis detected by the angular velocity detection unit 4. More specifically, the state finding unit 5 finds states (for example, the speed and the amount of rotation) of the tennis ball B having been hit with the tennis racket 200 on the basis of the Z axis angular velocity Gz of the state finding apparatus 100 around the Z axis and the X axis angular velocity Gx thereof around the X axis, which are detected by the first sensor 4a and the second sensor 4b of the angular velocity detection unit 4, respectively.

The state finding unit 5 finds the speed of the tennis ball B having been hit with the tennis racket 200 on the basis of the Z axis angular velocity detected by the first sensor 4a, for example.

In a case where a right-handed user hits the tennis ball B with the tennis racket 200 with the forehand, the basic movement just before the contact between the tennis racket 200 and the tennis ball B is rotational movement with an axis which vertically passes through the center of the head and the body (or an axis which vertically passes through the right shoulder) of the user as a rotation axis (see FIG. 4A). Hence, the energy component to hit the tennis ball B forward is proportional to the square of the Z axis angular velocity Gz of the tennis racket 200 around the Z axis. Therefore, it is presumed that the larger the value of the Z axis angular velocity Gz detected by the first sensor 4a when the tennis racket 200 and the tennis ball B contact with each other is, the faster the speed of the tennis ball B is, the first sensor 4a being included in the state finding apparatus 100 fixed to the tennis racket 200.

Figure 5A:
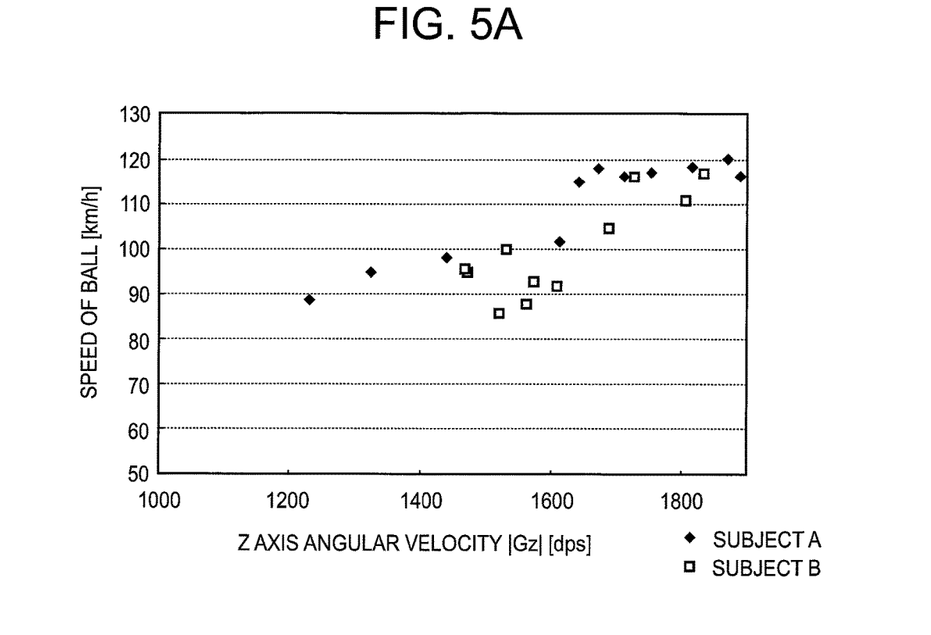
FIG. 5A shows the speed of a ball with respect to an angular velocity detected.

For example, FIG. 5A shows a correspondence between the absolute value of the Z axis angular velocity Gz when the tennis racket 200 and the tennis ball B contact with each other and the speed of the tennis ball B measured by using a Doppler radar. As shown in FIG. 5A, it is considered that a correspondence exists between the value of the Z axis angular velocity Gz and the speed of the tennis ball B regardless of individual difference.

Hence, the state finding unit 5 performs a predetermined mathematical operation on the basis of the value of the Z axis angular velocity Gz detected by the first sensor 4a to find an expected speed [km/h] of the tennis ball B having been hit with the tennis racket 200. More specifically, the state finding unit 5 uses a predetermined conversion formula suitable for the physical feature (for example, the height and/or the length of an arm) of a user to find an expected speed [km/h] of the tennis ball B from the value of the Z axis angular velocity Gz, for example.

The state finding unit 5 also finds the amount of rotation of the tennis ball B which rotates on a predetermined axis, i.e. the amount of rotation of the tennis ball B on a predetermined axis, the tennis ball B having been hit with the tennis racket 200, on the basis of the X axis angular velocity Gx detected by the second sensor 4b, for example.

In a case where a right-handed user hits the tennis ball B with the tennis racket 200 with a predetermined hitting way, the basic movement just before the contact between the tennis racket 200 and the tennis ball B is rotational movement around the right elbow with an axis in the front-back direction as a rotation axis, so that the tennis ball B spins on a predetermined axis (see FIG. 4B). Therefore, it is presumed that the larger the value of the X axis angular velocity Gx detected by the second sensor 4b when the tennis racket 200 and the tennis ball B contact with each other is, the greater the amount of rotation of the tennis ball B is, the second sensor 4b being included in the state finding apparatus 100 fixed to the tennis racket 200.

Figure 5B:
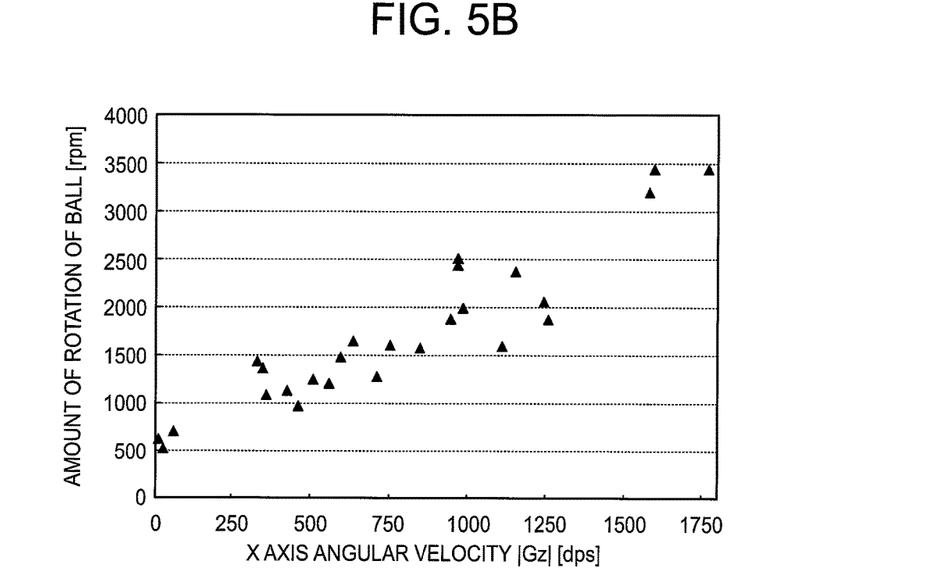
FIG. 5B shows the amount of rotation of a ball with respect to an angular velocity detected.
Figure 6A:
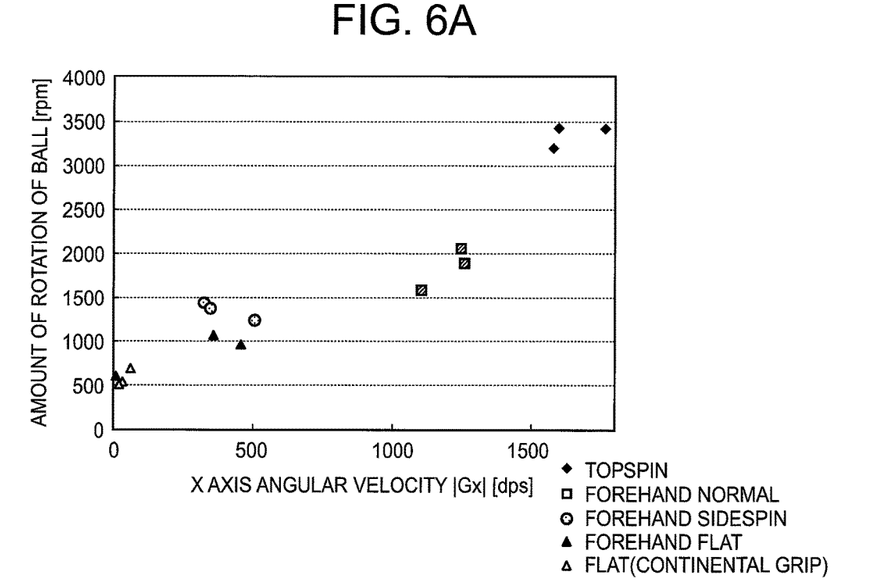
FIG. 6A shows the amount of rotation of a ball with respect to an X axis angular velocity detected.
Figure 6B:
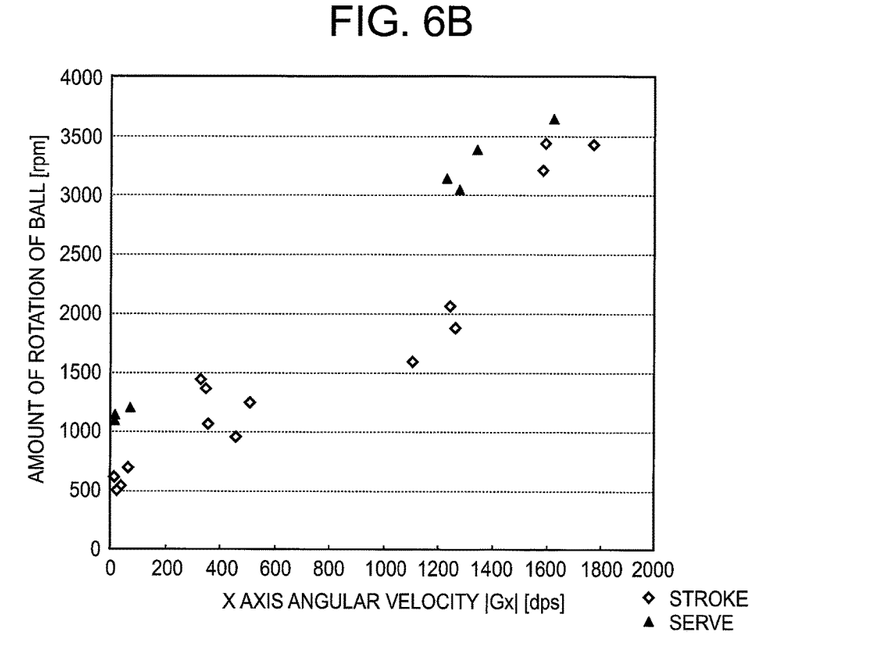
FIG. 6B shows the amount of rotation of a ball with respect to the X axis angular velocity detected.

For example, FIG. 5B shows a correspondence between the absolute value of the X axis angular velocity Gx when the tennis racket 200 and the tennis ball B contact with each other and the amount of rotation of the tennis ball B measured. As shown in FIG. 5B, it is considered that a correspondence exists between the value of the X axis angular velocity Gx and the amount of rotation of the tennis ball B. Further, as shown in FIG. 6A, it is considered that, having a predetermined correspondence therebetween, the absolute value of the X axis angular velocity Gx and the amount of rotation of the tennis ball B vary depending on how to hit the tennis ball B (for example, topspin, forehand normal or forehand sidespin) and how to hold the tennis racket 200 (for example, forehand flat or flat (continental grip)). Further, as shown in FIG. 6B, between serves and strokes, which are largely different in the way of hitting the tennis ball B, although the amounts of rotation of the tennis ball B by serves are greater than the amounts of rotation thereof by strokes, tendencies in data of serves and tendencies in data of strokes are very similar. Hence, it is considered that a correspondence exists between the absolute value of the X axis angular velocity Gx and the amount of rotation of the tennis ball B.

Hence, the state finding unit 5 performs a predetermined mathematical operation on the basis of the value of the X axis angular velocity Gx detected by the second sensor 4b to find an expected amount of rotation [rpm] of the tennis ball B on a predetermined axis, the tennis ball B having been hit with the tennis racket 200. More specifically, the state finding unit 5 uses a predetermined conversion formula suitable for the physical feature (for example, the height and/or the length of an arm) of a user to find an expected amount of rotation [rpm] of the tennis ball B from the value of the X axis angular velocity Gx, for example.

In FIGS. 5B, 6A and 6B, as the amount of rotation of the tennis ball B, the number of revolutions per minute (rpm) is shown. The number of revolutions per minute (rpm) is calculated from the time needed for the tennis ball B to make one revolution (rotation) calculated on the basis of images of the tennis ball B picked up by a high speed camera.

The state comparison unit 6 compares the speed of the tennis ball B with a predetermined speed.

That is, the state comparison unit 6 compares the state of the tennis ball B found by the state finding unit 5 with a predetermined speed. More specifically, the state comparison unit 6 compares the expected speed [km/h] of the tennis ball B found by the state finding unit 5 with a predetermined speed, such as a target value specified through a predetermined operation by a user onto the operation input unit 9 or a predetermined reference speed. Then, the state comparison unit 6 outputs the comparison result to the light emitting unit 7 and/or the display unit 8.

In the embodiment, the state comparison unit 6 compares the speed of the tennis ball B with a predetermined speed. However, this is not a limitation but an example. Hence, the state comparison unit 6 may compare the expected amount of rotation of the tennis ball B with a predetermined amount of rotation.

The light emitting unit 7 includes a light emitting diode and is disposed at a predetermined point on the surface of the state finding apparatus 100 (see FIG. 2), for example. The light emitting unit 7 notifies the comparison result of the state comparison unit 6 by light emission modes. For example, when the speed of the tennis ball B having been hit with the tennis racket 200 reaches a predetermined speed according to the comparison result of the state comparison unit 6, the light emitting unit 7 applies a predetermined voltage to the light emitting diode to emit light of a first color (for example, blue). On the other hand, when the speed of the tennis ball B having been hit therewith does not reach the predetermined speed according to the comparison result thereof, the light emitting unit 7 does not emit any light through the light emitting diode or applies a predetermined voltage to the light emitting diode to emit light of a second color (for example, red) which is different from the first color.

Thus, the light emitting unit 7 notifies the comparison result of the state comparison unit 6. Instead of or in addition to the light emission of the light emitting unit 7, the display unit 8 may display predetermined information thereon to notify the comparison result of the state comparison unit 6. The light emission of the light emitting unit 7 and the information display of the display unit 8 are not limitations but examples of how to notify the comparison result. Hence, for example, it is possible that a not-shown sound emitting unit emits a sound to notify the comparison result.

The display unit 8 is disposed at a predetermined point on the surface of the state finding apparatus 100 (see FIG. 2) and displays thereon various pieces of information such as the speed or the amount of rotation of the tennis ball B, for example. More specifically, the display unit 8 includes a seven-segment liquid crystal display panel and controls lighting up/out of each segment to display various pieces of information thereon, for example.

The operation input unit 9 includes: data input keys to input numerical values, characters and the like; up, down, right and left movement keys for data selection, moving operations and the like; and various function keys. The operation input unit 9 outputs press signals corresponding to the keys pressed by a user to the CPU of the central control unit 1.

As the operation input unit 9, a touch panel (not shown) may be disposed on a display screen of the display unit 8 so that various instructions corresponding to the touched points on the touch panel are input.

Next, a state finding process performed by the state finding apparatus 100 is described with reference to FIG. 7.

Figure 7:
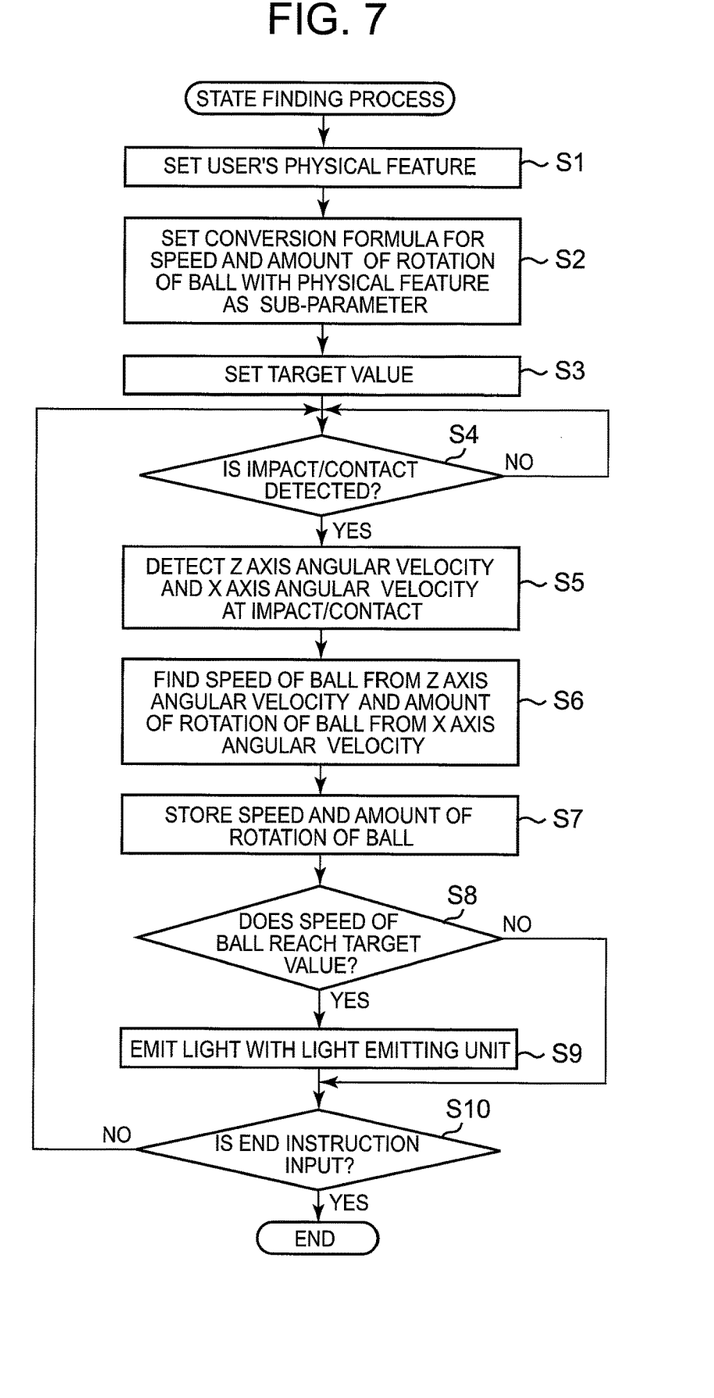
FIG. 7 is a flowchart showing an example of operations of a state finding process performed by the state finding apparatus shown in FIG. 1.

FIG. 7 is a flowchart showing an example of operations of the state finding process.

Note that the state finding apparatus 100 is fixed to the shaft part 203 of the tennis racket 200.

As shown in FIG. 7, first, the CPU of the central control unit 1 sets and stores into the memory 2 the physical feature (for example, the height and/or the length of an arm) of a user input through a predetermined operation by the user onto the operation input unit 9 (Step S1).

Next, the state finding unit 5 sets conversion formulas to find the speed [km/h] and the amount of rotation [rpm] of the tennis ball B, which has been hit with the tennis racket 200, with the set physical feature of the user as sub-parameters (Step S2).

Next, the CPU of the central control unit 1 sets and temporarily stores into the memory 2 a speed [km/h] of the tennis ball B input through a predetermined operation by the user onto the operation input unit 9 as a target value (Step S3). The CPU of the central control unit 1 may set an amount of rotation [rpm] of the tennis ball B as a target value.

Next, when the user makes a movement to hit the tennis ball B with the tennis racket 200, the contact detection unit 3 determines whether or not contact between the tennis racket 200 and the tennis ball B is detected on the basis of the value of the Z axis angular velocity Gz outputted from the first sensor 4a (Step S4). The contact detection unit 3 determines whether or not contact between the tennis racket 200 and the tennis ball B is detected (Step S4) each time the value of the Z axis angular velocity Gz is input thereto until the contact detection unit 3 determines that the contact therebetween is detected (Step S4; YES).

When the contact detection unit 3 determines that the contact between the tennis racket 200 and the tennis ball B is detected (Step S4; YES), the first sensor 4a of the angular velocity detection unit 4 detects the Z axis angular velocity Gz of the state finding apparatus 100 around the Z axis at the contact, and the second sensor 4b thereof detects the X axis angular velocity Gx of the state finding apparatus 100 around the X axis at the contact (Step S5). More specifically, when the angular velocity detection unit 4 receives the timing information indicating the contact from the contact detection unit 3, the first sensor 4a detects the Z axis angular velocity Gz at the contact, and the second sensor 4b detects the X axis angular velocity Gx at the contact.

Then, the angular velocity detection unit 4 outputs the value of the X axis angular velocity Gx detected by the first sensor 4a and the value of the Z axis angular velocity Gz detected by the second sensor 4b to the state finding unit 5.

Next, the state finding unit 5 finds the speed of the tennis ball B having been hit with the tennis racket 200 on the basis of the input value of the Z axis angular velocity Gz and also finds the amount of rotation of the tennis ball B on a predetermined axis, the tennis ball B having been hit with the tennis racket 200, on the basis of the input value of the X axis angular velocity Gx (Step S6). More specifically, the state finding unit 5 finds an expected speed [km/h] of the tennis ball B from the value of the Z axis angular velocity Gz and an expected amount of rotation [rpm] of the tennis ball B from the value of the X axis angular velocity Gx by using preset conversion formulae.

Then, the state finding unit 5 outputs and temporarily stores into the memory 2 the found speed [km/h] and amount of rotation [rpm] of the tennis ball B (Step S7).

Next, the state comparison unit 6 compares the speed [km/h] of the tennis ball B found by the state finding unit 5 with the speed [km/h] set in advance as the target value to determine whether or not the speed [km/h] of the tennis ball B reaches the target value [km/h] (Step S8).

When the state comparison unit 6 determines that the speed [km/h] of the tennis ball B reaches the target value [km/h] (Step S8; YES), the light emitting unit 7 applies a predetermined voltage to the light emitting diode to emit light of a first color (for example, blue) (Step S9).

Next, the CPU of the central control unit 1 determines whether or not an instruction to end the state finding process is input through a predetermined operation by the user onto the operation input unit 9 (Step S10).

When the state comparison unit 6 determines that the speed [km/h] of the tennis ball B does not reach the target value [km/h] (Step S8; NO) too, the CPU of the central control unit 1 determines whether or not an instruction to end the state finding process is input (Step S10), skipping Step S9.

When determining that an instruction to end the state finding process is not input (Step S10; NO), the CPU of the central control unit 1 returns the process to Step S4 so that the contact detection unit 3 determines whether or not contact between the tennis racket 200 and the tennis ball B is detected (Step S4).

On the other hand, when determining that an instruction to end the state finding process is input (Step S10; YES), the CPU of the central control unit 1 ends the state finding process.

As described above, according to the state finding apparatus 100 of the embodiment, a value of an angular velocity of a first object (for example, the tennis racket 200) around a predetermined axis when the first object and a second object (for example, the tennis ball B) contact with each other is obtained, and a state of the second object is found on the basis of the obtained value of the angular velocity.

Accordingly, even when the position or the moving direction of the second object changes, a state of the second object having contacted with the first object can be properly found on the basis of an angular velocity of the state finding apparatus 100 around a predetermined axis. More specifically, it is possible that the state finding apparatus 100 is detachably fixed to the tool (for example, the tennis racket 200) to hit the second object (for example, the tennis ball B); an angular velocity (for example, the Z axis angular velocity Gz) of the state finding apparatus 100 around a predetermined axis is detected on the basis of detection of contact between the tool and the second object; and a state of the second object having been hit with the tool is found on the basis of the detected angular velocity.

That is, even in a situation in which the position or the moving direction of the tennis ball B (second object) always changes, so that a conventional configuration to measure a state of the second object cannot handle, such as a rally in tennis, a state of the second object having been hit with the first object can be properly and always found on the basis of an angular velocity of the state finding apparatus 100 around a predetermined axis, the state finding apparatus being detachably fixed to the first object.

Further, states of the second object having contacted with the first object can be found on the basis of angular velocities of the state finding apparatus 100 around two axes being perpendicular to each other.

More specifically, the speed of the second object having contacted with the tool is found on the basis of a first angular velocity (Z axis angular velocity Gz) of the state finding apparatus 100 around a first axis (Z axis) which is approximately parallel to a surface of the tool (for example, the face of the tennis racket 200), the surface including a hitting part to hit the second object, and approximately perpendicular to the extending direction of a holding part of the tool (for example, the grip part 201 of the tennis racket 200), the holding part being held by a user. Accordingly, even when the position or the moving direction of the second object changes, the speed of the second object having contacted with the tool can be properly found. In addition, the amount of rotation of the second object on a predetermined axis, the second object having contacted with the tool, is found on the basis of a second angular velocity (X axis angular velocity Gx) of the state finding apparatus 100 around a second axis (X axis) which is approximately perpendicular to the surface. Accordingly, even when the position or the moving direction of the second object changes, the amount of rotation of the second object having contacted with the tool can be properly found.

Further, the state finding apparatus 100 is fixed onto an axis (Y axis) in the extending direction of the holding part. Accordingly, the first angular velocity of the state finding apparatus 100 around the first axis and the second angular velocity of the state finding apparatus 100 around the second axis can be properly detected, and hence the speed and the amount of rotation of the second object having contacted with the tool can be properly found.

Further, the contact between the tool and the second object can be detected on the basis of an angular velocity (Z axis angular velocity Gz) of the state finding apparatus 100 around an axis (Z axis) which is approximately parallel to the surface of the tool (for example, the face of the tennis racket 200), the surface including the hitting part to hit the second object, and approximately perpendicular to the extending direction of the holding part (for example, the grip part 201) of the tool, the holding part being held by a user, and accordingly, the contact between the tool and the second object can be properly detected with a simple configuration.

Further, the found state of the second object is compared with a predetermined state, and the comparison result is notified. Accordingly, for example, in a situation in which a user keeps hitting the second object with the tool, the user can always know the state of the second object having been hit with the tool, and by extension, a movement or state of the body of the time when having hit the second object with the tool.

The present invention is not limited to the above embodiment, and hence various modifications and design changes can be made without departing from the scope of the present invention.

In the embodiment, predetermined conversion formulae are used to find the speed [km/h] and the amount of rotation [rpm] of the tennis ball B from the values of the Z axis angular velocity Gz and the X axis angular velocity Gx. However, the methods for finding them are not limited thereto and hence can be changed to another appropriately. For example, a table in which values of the Z axis angular velocity Gz and values of the X axis angular velocity Gz are correlated with speeds [km/h] of the tennis ball B and amounts of rotation [rpm] of the tennis ball B, respectively, may be used to find the speed [km/h] and the amount of rotation [rpm] of the tennis ball B.

Further, in the embodiment, the contact of the tennis ball B onto the tennis racket 200, i.e. the contact between the tennis racket 200 and the tennis ball B, is detected on the basis of an angular velocity. However, this is not a limitation but an example. Any configuration can be used as long as the contact between the tennis racket 200 and the tennis ball B can be detected. For example, the tennis racket 200 may be provided with a pressure sensor or have an electrical component to detect the contact between the tennis racket 200 and the tennis ball B. In this case, for example, a state of the tennis ball B may be found on the basis of an angular velocity relevant to time information about time when the contact therebetween is detected by the pressure sensor or the electrical component.

Further, in the embodiment, the state finding apparatus 100 is attached to the tennis racket 200. However, it is possible that the state finding apparatus 100 is not attached to the tennis racket 200. In this case, the tennis racket 200 is provided with the first sensor 4a and the second sensor 4b to detect the angular velocities, and the state finding apparatus 100 has functions same as those of the contact detection unit 3, the state finding unit 5, the state comparison unit 6, the light emitting unit 7 and the display unit 8, whereby the objects achieved by the embodiment can be achieved.

That is, as long as the state finding apparatus 100 can obtain information about the Z axis angular velocity Gz and the X axis angular velocity Gx of the tennis racket 200 respectively around the Z axis and the X axis detected by the first sensor 4a and the second sensor 4b of the angular velocity detection unit 4 through wireless communication or the like, the state finding apparatus 100 can achieve the objects achieved by the embodiment with the functions same as those of the contact detection unit 3, the state finding unit 5, the state comparison unit 6, the light emitting unit 7 and the display unit 8.

It is also possible that the tennis racket 200 detects the contact between the tennis racket 200 and the tennis ball B from the information about the X axis angular velocity Gx and the Z axis angular velocity Gz and sends information about the contact to the state finding apparatus 100 through wireless communication or the like. In this case, the state finding apparatus 100 can achieve the objects achieved by the embodiment on the basis of the information about the contact, which the state finding apparatus 100 receives, with the functions same as those of the state finding unit 5, the state comparison unit 6, the light emitting unit 7 and the display unit 8.

In addition, in each of the above cases, it is possible that the tennis racket 200 detects the contact with the pressure sensor or the electrical component, which is provided for the tennis racket 200, and sends time information about the time when the contact is detected, information about values of the X axis angular velocity Gx and values of the Z axis angular velocity Gz and time information about times relevant to the values of the X axis angular velocity Gx and the values of the Z axis angular velocity Gz to the state finding apparatus 100, and then the state finding apparatus 100 analyzes a value of the X axis angular velocity Gx and a value of the Z axis angular velocity Gz relevant to the time information about the time when the contact is detected, thereby finding states of the tennis ball B.

Further, in the embodiment, the tennis racket 200 is used as the tool. However, this is not a limitation and hence can be changed to any tool with which an object (second object) is hit, such as a table-tennis racket, a baseball bat or a golf club. In this case, it is preferable that the state finding apparatus 100 be fixed onto an axis in the extending direction of the holding part, which is held by a user.

Further, the configuration of the state finding apparatus 100 described in the embodiment is an example and hence not limited thereto.

That is, although the case where a sport such as tennis is played is described in the embodiment, the present invention is applicable to, for example, a case where an accident happens, namely, applicable to detecting a crash and finding a state before and after the crash.

In addition, in the embodiment, the configuration is realized by the angular velocity detection unit 4 and the state finding unit 5 being driven under the control of the central control unit 1. However, this is not a limitation but an example, and hence the configuration may be realized by the CPU of the central control unit 1' executing a predetermined program.

That is, it is possible that a program including an information obtaining process routine and a finding process routine is stored in a program memory (not shown) where programs are stored, and the CPU of the central control unit 1 functions through the information obtaining process routine as an obtaining unit to obtain a value of an angular velocity of the first object around a predetermined axis of when the first object and the second object contact with each other and also functions through the finding process routine as a finding unit to find a state of the second object on the basis of the obtained value of the angular velocity.

Similarly, a contact detection unit, a comparison unit and a notifying unit may also be realized by the CPU of the central control unit 1 executing a predetermined program or the like.

Further, as a computer readable medium where the programs to execute the above-described processes are stored, other than a ROM or a hard disk, a nonvolatile memory such as a flash memory or a portable storage medium such as a CD-ROM may be used. Further as a medium to provide data of the programs via a predetermined communication line, a carrier wave may be used.

Some embodiments of the present invention are described above. However, the scope of the present invention is not limited to the embodiments but includes the scope of claims attached below and their equivalents.

What is claimed is:

1. A state finding apparatus comprising:
    a memory; and
    a processor which executes a program stored in the memory to perform processes comprising:
        an obtaining process which obtains a value of an angular velocity of a first object around a predetermined axis when the first object physically hits a second object; and
        a finding process which finds a speed or an amount of rotation of the second object based on the obtained value of the angular velocity of the first object,
    wherein the first object is an object distinct from the state finding apparatus, and the state finding apparatus is provided on the first object.

2. The state finding apparatus according to claim 1, wherein:
    the predetermined axis includes two predetermined axes being perpendicular to each other,
    the obtaining process obtains the value of the angular velocity of the first object around each of the axes, and
    the finding process finds the speed or the amount of rotation of the second object having been hit with the first object based on the obtained values of the angular velocities.

3. The state finding apparatus according to claim 1, wherein the processor executes the program to further perform a contact detection process which detects physical contact between the first object and the second object when the first object physically hits the second object, and
    wherein the obtaining process obtains the value of the angular velocity when the contact detection process detects the physical contact.

4. The state finding apparatus according to claim 1, wherein:
    the state finding apparatus is attached to a tool as the first object, and
    the finding process finds the speed or the amount of rotation of the second object based on the obtained value of the angular velocity of the tool.

5. The state finding apparatus according to claim 4, wherein:
    the obtaining process obtains a value of a first angular velocity of the state finding apparatus around a first axis which is approximately parallel to a surface of the tool, the surface including a hitting part to hit the second object, and approximately perpendicular to an extending direction of a holding part of the tool, the holding part being held by a user, and
    the finding process finds the speed of the second object having contacted with the tool based on the obtained value of the first angular velocity.

6. The state finding apparatus according to claim 5, wherein:
    the obtaining process obtains a value of a second angular velocity of the state finding apparatus around a second axis which is approximately perpendicular to the surface, and
    the finding process finds the amount of rotation of the second object on a predetermined axis, the second object having being hit with the tool, based on the obtained value of the second angular velocity.

7. The state finding apparatus according to claim 5, wherein the state finding apparatus is attached to the tool in such a way as to be fixed onto an axis in the extending direction of the holding part of the tool.

8. The state finding apparatus according to claim 4, wherein the contact detection process detects contact between the tool and the second object based on a value of an angular velocity of the state finding apparatus around an axis which is approximately parallel to a surface of the tool, the surface including a hitting part to hit the second object, and approximately perpendicular to an extending direction of a holding part of the tool, the holding part being held by a user.

9. The state finding apparatus according to claim 1, wherein the processor executes the program to perform further processes comprising:
   a comparison process which compares a state of the second object found by the finding process with a predetermined state; and
   a notifying process which notifies a result of the comparison carried out by the comparison process.

10. The state finding apparatus according to claim 1, wherein:
   the first object comprises a racket or a golf club, and
   the second object comprises a ball.

11. The state finding apparatus according to claim 1, wherein:
   the state finding apparatus is attached to a tool as the first object,
   the obtaining process obtains the value of the angular velocity of the state finding apparatus around an axis which is approximately perpendicular to a surface of the tool, the surface including a hitting part to physically hit the second object, and
   the finding process finds the amount of rotation of the second object having been physically hit with the tool based on the obtained value of the angular velocity.

12. The state finding apparatus according claim 1, wherein the obtaining process obtains the value of the angular velocity of the first object around the predetermined axis when the first object makes physical contact with the second object.

13. The state finding apparatus according claim 1, wherein the obtaining process obtains the value of the angular velocity of the first object around the predetermined axis when the first object directly physically hits the second object.

14. A state finding method using a state finding apparatus, the state finding method comprising:
   obtaining a value of an angular velocity of a first object around a predetermined axis when the first object physically hits a second object; and
   finding a speed or an amount of rotation of the second object based on the obtained value of the angular velocity of the first object,
   wherein the first object is an object distinct from the state finding apparatus, and the state finding apparatus is provided on the first object.

15. A non-transitory computer readable storage medium on which a program is stored, the program controlling a computer of a state finding apparatus to perform processes comprising:
   an obtaining process which obtains a value of an angular velocity of a first object around a predetermined axis when the first object physically hits a second object; and
   a finding process which finds a speed or an amount of rotation of the second object based on the obtained value of the angular velocity of the first object,
   wherein the first object is an object distinct from the state finding apparatus, and the state finding apparatus is provided on the first object.

* * * * *

UNITED STATES PATENT AND TRADEMARK OFFICE
CERTIFICATE OF CORRECTION

PATENT NO. : 10,203,347 B2
APPLICATION NO. : 13/968186
DATED : February 12, 2019
INVENTOR(S) : Kazuaki Abe Page 1 of 1

It is certified that error appears in the above-identified patent and that said Letters Patent is hereby corrected as shown below:

In the Claims

Column 14, Line 1, Claim 12, after "according" insert --to--.

Column 14, Line 6, Claim 13, after "according" insert --to--.

Signed and Sealed this
Twenty-eighth Day of May, 2019

Andrei Iancu
*Director of the United States Patent and Trademark Office*